(12) United States Patent
Kraus et al.

(10) Patent No.: US 9,393,608 B2
(45) Date of Patent: Jul. 19, 2016

(54) FOLDING DEVICE

(75) Inventors: Johann Kraus, Mertingen (DE);
Wolfgang Fischer, Augsburg (DE)

(73) Assignee: KUKA Systems GmbH, Augsburg (DE)

( * ) Notice: Subject to any disclaimer, the term of this patent is extended or adjusted under 35 U.S.C. 154(b) by 633 days.

(21) Appl. No.: 13/635,824

(22) PCT Filed: Mar. 18, 2011

(86) PCT No.: PCT/EP2011/054111
§ 371 (c)(1),
(2), (4) Date: Sep. 18, 2012

(87) PCT Pub. No.: WO2011/113928
PCT Pub. Date: Sep. 22, 2011

(65) Prior Publication Data
US 2013/0008012 A1  Jan. 10, 2013

(30) Foreign Application Priority Data
Mar. 19, 2010 (DE) ...................... 20 2010 000 426 U

(51) Int. Cl.
*B21D 39/00* (2006.01)
*B23P 11/00* (2006.01)
(Continued)

(52) U.S. Cl.
CPC ............ *B21D 39/021* (2013.01); *B21D 19/043* (2013.01); *B21D 39/023* (2013.01); *B21D 53/88* (2013.01); *B23Q 17/22* (2013.01); *Y10T 29/49906* (2015.01); *Y10T 29/49908* (2015.01); *Y10T 29/49915* (2015.01);
(Continued)

(58) Field of Classification Search
CPC .. B21D 39/021; B21D 39/023; B21D 19/043; B21D 53/88; B21D 43/003; B21D 43/029; B21D 43/105; B21D 43/24; Y10T 29/49915; Y10T 29/53422; Y10T 29/53004; Y10T 29/49906; Y10T 20/44908; Y10T 29/49936; Y10T 29/51; Y10T 29/5196; Y10T 29/53; Y10T 29/534; Y10T 29/5124; Y10T 29/5136; B23Q 17/22
USPC .................. 72/420, 421, 422, 426; 29/509
See application file for complete search history.

(56) References Cited

U.S. PATENT DOCUMENTS 5,901,595 A * 5/1999 Massee .............................. 72/81
5,902,496 A * 5/1999 Alborante ............ B23K 37/047
219/158
(Continued)

FOREIGN PATENT DOCUMENTS

DE 10 2006 051 245 A1  5/2008
DE 10 2007 024 777 A1  11/2008
(Continued)

*Primary Examiner* — Essama Omgba
*Assistant Examiner* — Darrell C Ford
(74) *Attorney, Agent, or Firm* — McGlew and Tuttle, P.C.

(57) ABSTRACT

A hemming device (2) and a hemming method are provided in which the hemming device (2) has a hemming bed (14) for a workpiece (3) and multiple hemming robots (8, 9) with hemming tools (20). The hemming device (2) is designed to hem inner and outer lock seams (5, 6) on both sides of the workpiece (3). The hemming robots (8, 9) lie on different sides of the hemming bed (14), and the hemming bed (14) is further designed and arranged for accessing inner and outer lock seams (5, 6) on both sides of the workpiece (3) from front and rear sides (15, 16). For this purpose, the hemming bed can have a section (19) for a rearward access to an inner lock seam (5) and a bedding for inner and outer lock seams (5, 6).

38 Claims, 14 Drawing Sheets

(51) Int. Cl.
  *B21D 43/00*  (2006.01)
  *B21D 43/10*  (2006.01)
  *B21D 43/11*  (2006.01)
  *B21D 39/02*  (2006.01)
  *B21D 19/04*  (2006.01)
  *B21D 53/88*  (2006.01)
  *B23Q 17/22*  (2006.01)

(52) U.S. Cl.
  CPC ....... *Y10T 29/49936* (2015.01); *Y10T 29/5124* (2015.01); *Y10T 29/5134* (2015.01); *Y10T 29/5196* (2015.01); *Y10T 29/53* (2015.01); *Y10T 29/53004* (2015.01); *Y10T 29/53422* (2015.01)

(56) References Cited

U.S. PATENT DOCUMENTS

| | | | |
|---|---|---|---|
| 6,324,880 B1 * | 12/2001 | Nakamura | 72/17.3 |
| 6,694,793 B1 * | 2/2004 | Persson | 72/220 |
| 7,774,928 B2 * | 8/2010 | Toeniskoetter | 29/784 |
| 9,095,887 B2 * | 8/2015 | Tsuda | B21D 39/023 |
| 2006/0053613 A1 | 3/2006 | Savoy | |
| 2006/0053616 A1 * | 3/2006 | Steed et al. | 29/505 |
| 2006/0123615 A1 * | 6/2006 | Toeniskoetter | 29/429 |
| 2007/0222014 A1 * | 9/2007 | Toeniskoetter | 257/446 |
| 2008/0236236 A1 * | 10/2008 | Toeniskoetter | 72/220 |
| 2008/0245124 A1 * | 10/2008 | Chaker et al. | 72/214 |
| 2008/0302159 A1 * | 12/2008 | Toeniskoetter et al. | 72/214 |
| 2009/0038361 A1 * | 2/2009 | Toeniskoetter | B21D 39/021 72/214 |
| 2009/0089995 A1 * | 4/2009 | Toeniskoetter et al. | 29/463 |
| 2010/0252973 A1 * | 10/2010 | Reith et al. | 269/37 |
| 2011/0048094 A1 * | 3/2011 | Toeniskoetter | 72/306 |
| 2011/0107807 A1 * | 5/2011 | Sato et al. | 72/220 |
| 2012/0297854 A1 * | 11/2012 | Cyrek et al. | 72/372 |
| 2013/0312473 A1 * | 11/2013 | Kraus et al. | 72/21.4 |

FOREIGN PATENT DOCUMENTS

| | | |
|---|---|---|
| EP | 0 978 334 A2 | 2/2000 |
| FR | 2 924 369 B1 | 11/2009 |
| JP | H04 64424 U | 6/1992 |
| JP | 9 038733 A | 2/1997 |
| JP | 2007-210005 A | 8/2007 |
| WO | 99/37418 A1 | 7/1999 |
| WO | 99/37419 A1 | 7/1999 |

* cited by examiner

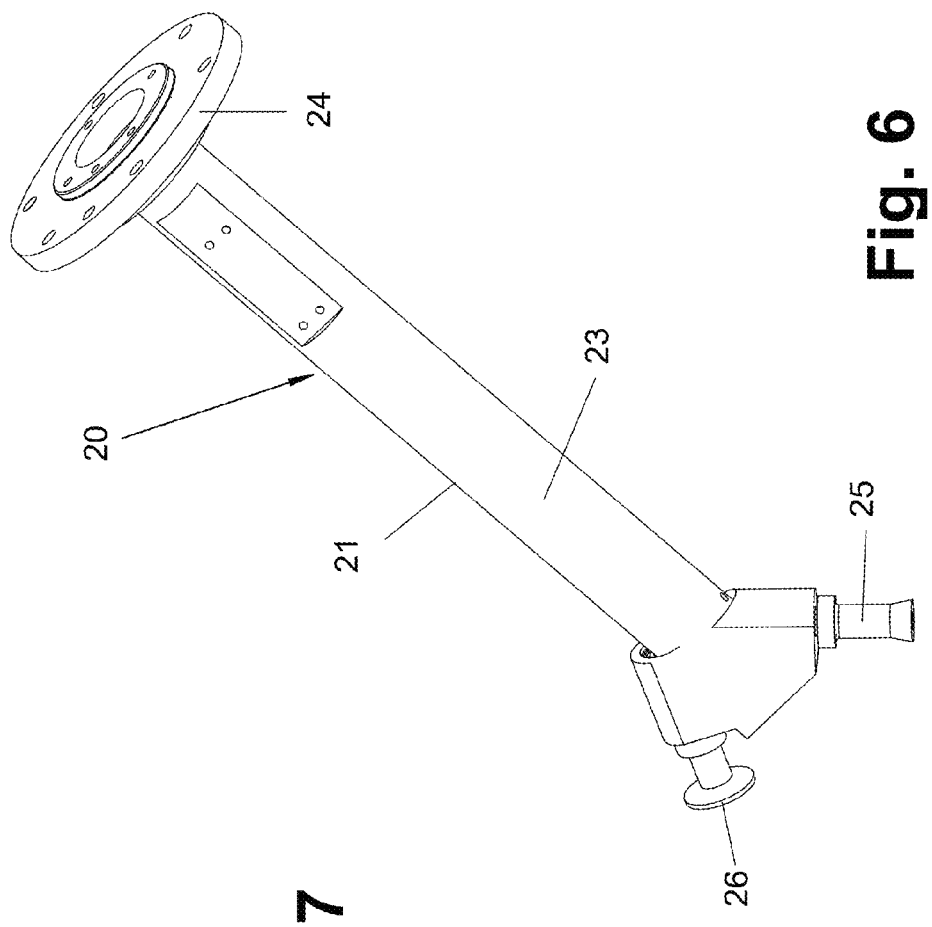
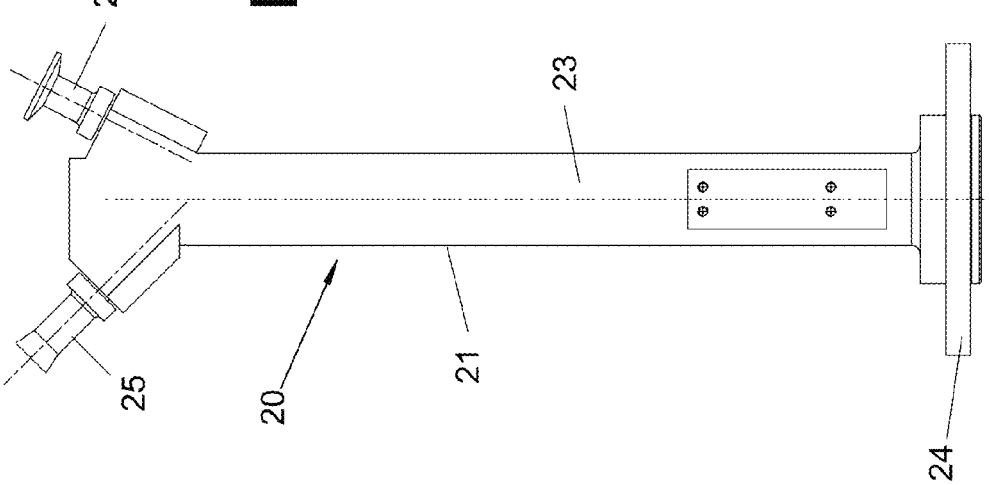

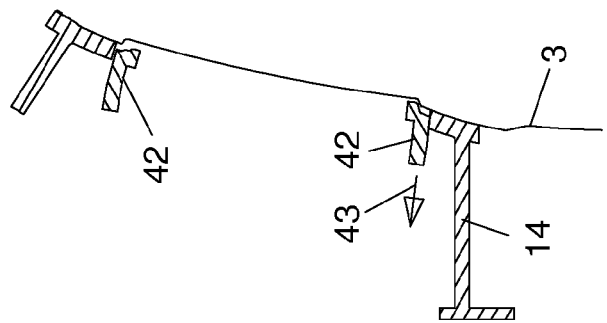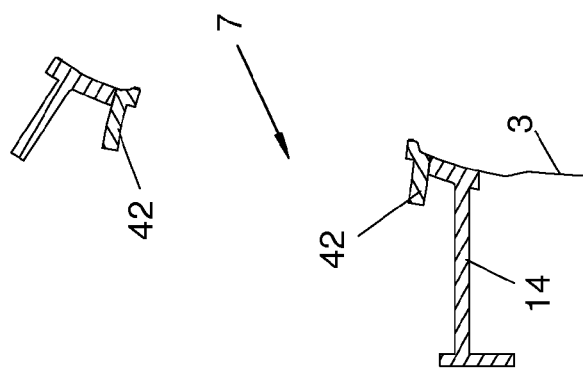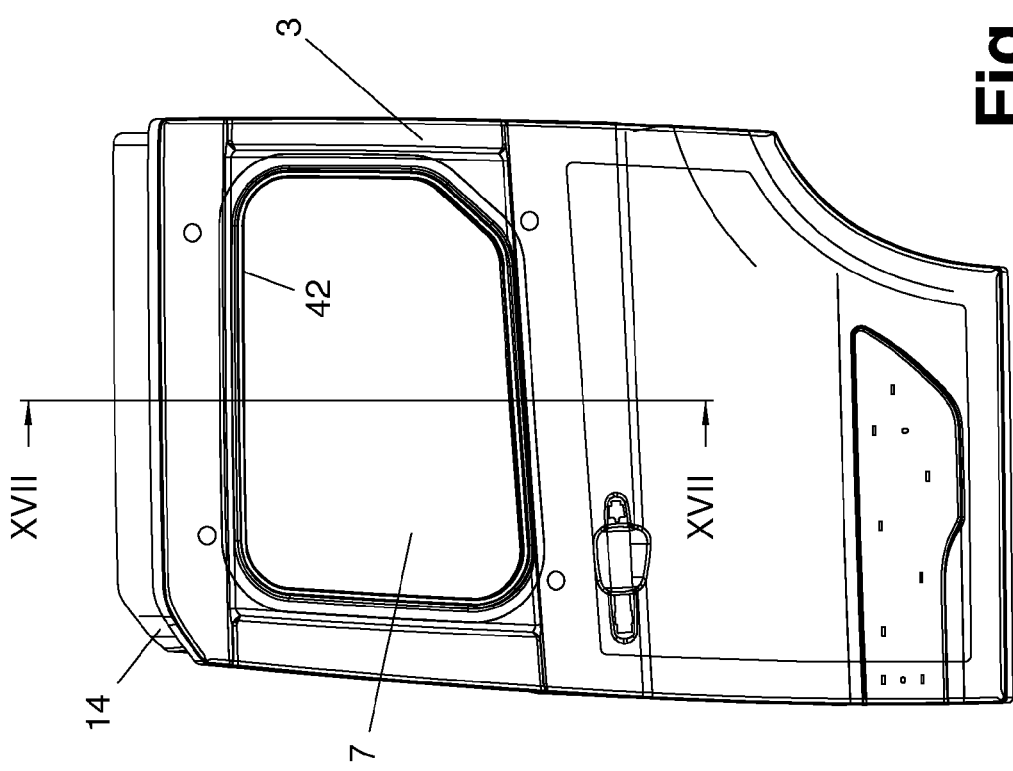

FOLDING DEVICE

CROSS REFERENCE TO RELATED APPLICATIONS

This application is a United States National Phase application of International Application PCT/EP2011/054111 and claims the benefit of priority under 35 U.S.C. §119 of German Patent Application DE 20 2010 000 426.8 filed Mar. 19, 2010, the entire contents of which are incorporated herein by reference.

FIELD OF THE INVENTION

The present invention pertains to a hemming device with a hemming bed for a workpiece and with a plurality of hemming robots with hemming tools.

BACKGROUND OF THE INVENTION

DE 10 2007 024 777 A1 shows a roller hemming device, which has a horizontal hemming bed with laterally arranged hemming robots, which hem the flanges of the workpiece together with roller hemming heads, wherein the hemming bed additionally rotates by means of an axis of rotation of its own. The hemming robots hem outer flanges of the workpiece and both act on the front side of the workpiece.

If a workpiece, e.g., a vehicle door, has inner and outer flanges or lock seams, which are accessible and hemmed from different main sides of the workpiece, especially from the front side and the rear side of the workpiece, there is in practice a change from one station to another, with the workpiece being picked up after hemming one flange, e.g., the outer flange, and transported to a next hemming device in order to hem the other, e.g., inner flange there.

SUMMARY OF THE INVENTION

An object of the present invention is to provide a better and more efficient hemming technique.

The hemming technique according to the invention, especially the hemming device, has a higher efficiency and better economy. Both inner and outer flanges can be hemmed in the hemming device, which can take place at the same hemming bed and especially also at the same time. The hemming robots, arranged, e.g., on the front side and rear side of the hemming bed, do not mutually interfere with one another. The process times for the inner and outer flanges can be superimposed to one another, and the set-up time and transport time, which were hitherto necessary during the change from one station to another due to the hemming, are eliminated as well. The hemming technique being according to the invention is faster than the state of the art and requires less logistic effort as well as less space compared to the state of the art.

The hemming processes can be carried out by roller hemming with the hemming robots. Should additional corner hemming operations be necessary, these can likewise be implemented without resetting or change from one station to another being necessary.

The capacity of the hemming device can be expanded by means of a conveying means. It makes it possible to hem identical or even different workpieces in the same means. Hemming processes can be concentrated and better localized for the preferred area of application of body parts as body shells, especially doors, drop tailgates or the like. In particular, a plurality of different workpieces, especially doors, of the same vehicle can be hemmed in the same hemming device. These may be, e.g., two or four side doors and possibly a drop tailgate. As an alternative, it is possible to process a plurality of identical workpieces in the hemming device. In conjunction with a conveying means, which has a plurality of work stations, set-up and hemming operations can take place in different cycles and with advancing of the hemming bed. The hemming device offers optimal flexibility, especially also due to changing the hemming bed, and can adapt itself to different hemming tasks more rapidly and more simply.

When hemming workpieces with a window cutout, e.g., doors or drop tailgates of a vehicle body, an inner hemming device, which forms the hem or hems located at the edge of the cutout, may be used in addition to the hemming robots. The inner hemming device may be attached, if needed, to the hemming bed or the support means or removed again, and a modular design is recommended. The hemming bed may be divided, as a whole, into segments and have a modular design, as a result of which it can be easily and rapidly adapted to workpieces of different shapes, which differ from each other in some of the shape features only.

To process workpieces with a window cutout, the hemming bed may have an inner hemming bed for the cutout area. This inner hemming bed can be deactivated at least in some areas, which can happen, e.g., by lowering. Such a design makes it possible to process workpieces of the same kind with different processing requirements in the window cutout area. This may be, e.g., the case of vehicle doors that have window panes with window lifters and therefore need hemming at the window cutout edges, and other types of construction of the door, which is essentially the same on the outside, have permanently installed window panes or a massive and non-cut-out window area and do not require processing by hemming. Deactivation eliminates the interfering contour of the inner hemming bed for such workpiece variants.

It is favorable for the precision and reproducibility of the hemming processes to provide a defined interface for the exact and reproducible positioning of a hemming bed on a stationary or mobile base. The position of the workpiece is also exactly defined hereby. This is especially advantageous in case of replaceable hemming beds.

To improve the quality of the process, it is favorable to exactly measure and calibrate the entire hemming device. This applies especially to the position and design of the components of the means in space and relative to one another. The components of the means in question may be the hemming bed or hemming beds, the interface(s) that is/are possibly present, a conveyor that is possibly present, one or more hemming tools and the different robots for processing and handling the workpieces and possibly the hemming beds. The different robots are measured and calibrated with absolute precision, optionally together with a tolerance compensation, taking the form and shape of the hemming tool into account.

High precision of the measurement and process is also advantageous for minimizing the effort needed for set-up. In manufacturing vehicle bodies, pilot stations are built, tested and optimized at first for presetting the manufacture. They are subsequently integrated in the mass production. After the end of the mass production, spare parts will still have to be manufactured and supplied over a rather long period of time. A separate hemming station is needed for this. When changing over from one model of a vehicle to another, the operations must be coordinated and merged with one another. The pilot phase and the set-up of a pilot hemming station begins during the mass production of the old model, which is coming to an end. The change from one model to another and the conversion of mass production for the new model must then proceed very rapidly. The spare parts must otherwise be manufactured in a separate hemming station after the end of the series. These retooling operations can be carried out very rapidly and exactly with the hemming technique according to the invention. There is increased flexibility for spare parts manufacture, and different workpieces, especially body parts, can be manufactured as needed and alternatingly with one another in one hemming station thanks to the variable hemming beds, and such manufacture can be kept low due to the flexibility of the stations needed and the design effort. The use of a control with processing program, which is adapted to the exactly measured and calibrated position, design and possibly kinematics of the components of the hemming device, is favorable here. When changing from one workpiece to another or in case of retooling a pilot station for mass production, only a little retooling effort is needed. The entire configuration of the hemming device or hemming station and of the components thereof can be detected and measured with a measuring means, and the existing processing process continues to be used and is adapted only concerning the results of the measurement. A completely new set-up of a hemming station is no longer necessary. Considerable time and costs can be saved. The flexible hemming station for the spare parts manufacture can be utilized optimally, and the effort needed before for multiple spare parts hemming stations can be markedly reduced.

The measurement of the hemming device or hemming station and the components thereof can be carried out with a stationary measuring means. This also permits measurement for testing and calibration purposes during the ongoing operation and thus makes possible a continuous quality control. All relevant components of the hemming device or hemming station can be advantageously detected and measured with the measuring means. The measuring can take place for a reference point that is common for all components, which may be, e.g., the foot of the coordinate system of the workpiece. A remeasurement or new measurement takes place again in case of a change from one workpiece to another or from one component to another by means of the same measuring means and can be related to the same reference point. The errors of measurement possibly detected now can be taken over as an offset for the respective component into the processing program.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a perspective view of a roller hemming head;

FIG. 7 is side view of the roller hemming head;

FIG. 16 is a top view of a door with a window cutout on a hemming bed;

FIG. 17 is a cut-away section through the hemming bed with the inner hemming bed raised according to section line VII-VII in FIG. 16; and FIG. 18 is a sectional view according to FIG. 17 with the inner hemming bed lowered.

DESCRIPTION OF THE PREFERRED EMBODIMENTS

Figure 1:
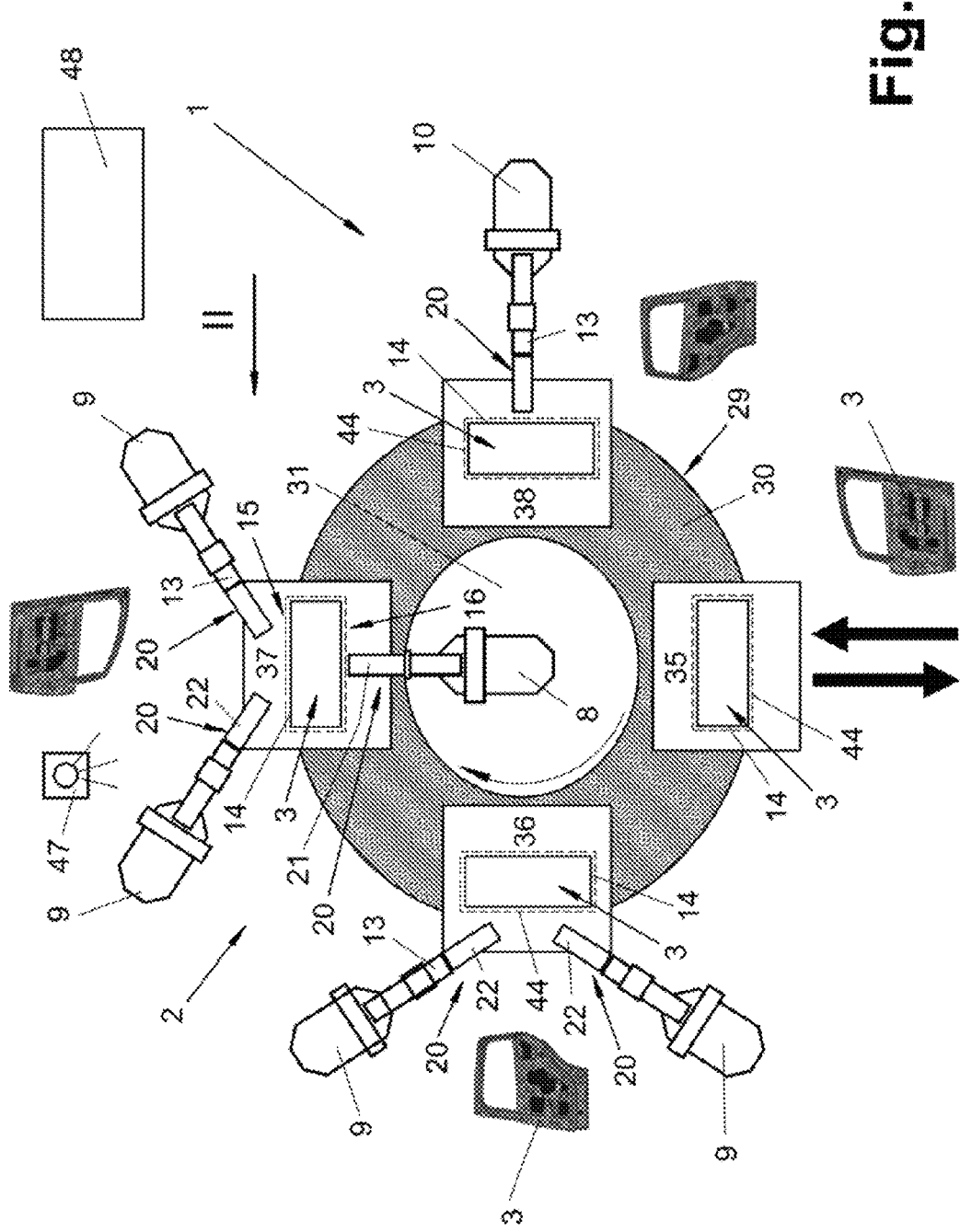
FIG. 1 is a top view of a hemming device for hemming workpieces on both sides.

Referring to the drawings in particular, the present invention pertains to a hemming device (2) for hemming one or more workpieces (3). The present invention pertains, furthermore, to a hemming station (1) equipped with such a hemming device (2) as well as to a hemming process.

The workpiece (3) may be of any desired type and design. It is preferably a body part consisting of metal sheets, which consist of, e.g., steel, light metal or the like. Workpiece (3) may be especially a side door of a body shell of a motor vehicle, as it is shown as an example in FIGS. 9 and 16. Such a side door may have a window cutout (7). The door (3) shown may be designed as a left side door and as a right side door and possibly vary as a front door and rear door according to FIG. 12. In another variant, it may be a tailgate with a window cutout. Furthermore, workpiece (3) may be a roof sheet with a roof cut-out. Further variants in the form of hoods, drop tailgates, covers or the like are possible.

Figure 5:
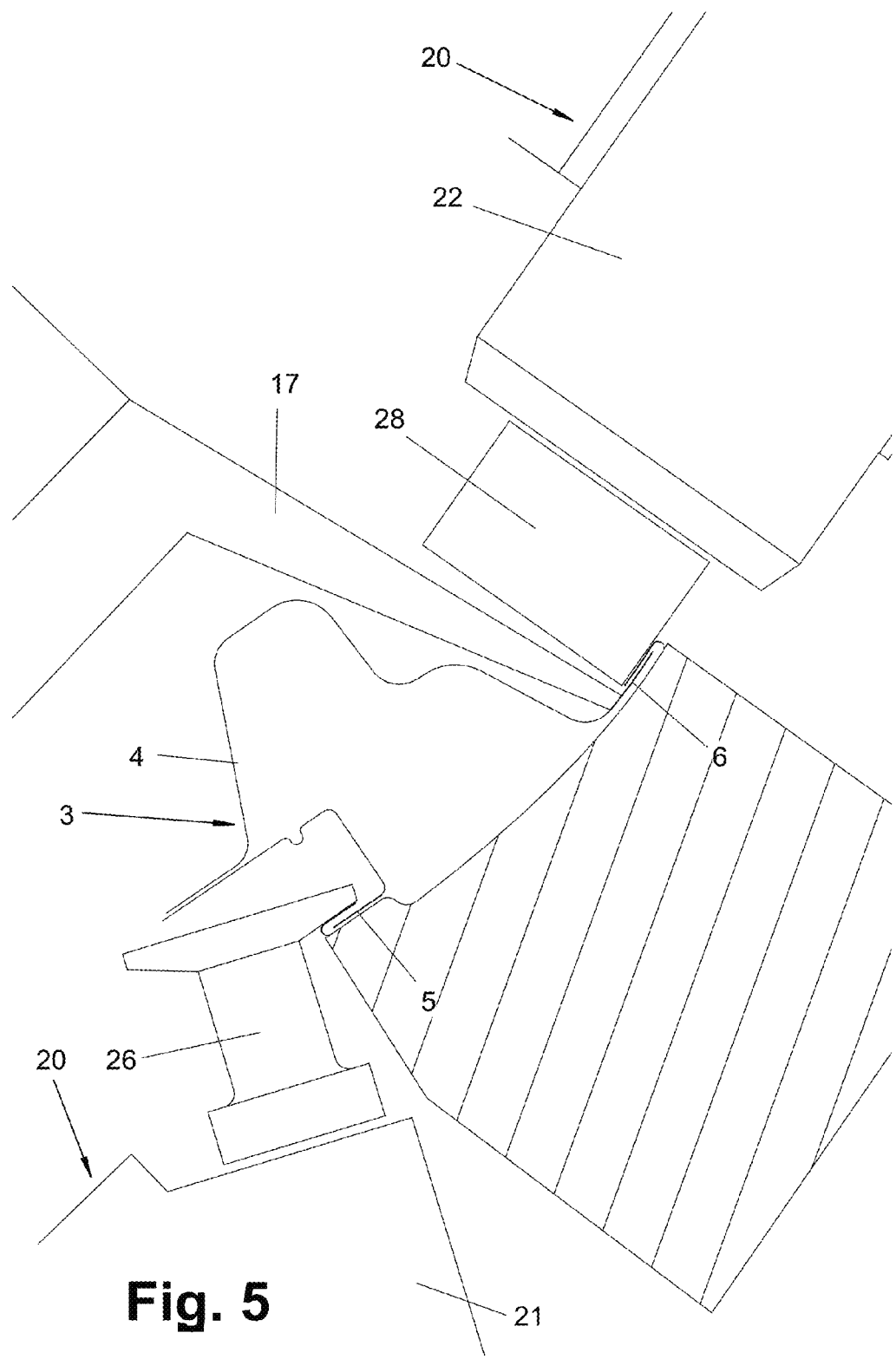
FIG. 5 is a cut-away and enlarged detail view of the hemming area.

Workpiece (3) has inner and outer lock seams (5, 6), which are accessible for hemming from different sides of the workpiece, which sides are located, e.g., opposite each other, as this is shown as an example in FIG. 5. These may be the main sides of the workpiece (3), especially the front side and the rear side, and may refer to a main plane of the workpiece (3). The inner and outer lock seams (5, 6) may also be located on different sides of the workpiece.

FIG. 5 shows a cross section through a hollow workpiece section (4), especially a cross-tie, of the workpiece (3), in the area of the window cutout (7). The outer lock seam (6) is located on the outside of the cross-tie and can continue in an outer lock seam extending on the outside around the door contour, as it is suggested in FIG. 9. The inner lock seam (5) is located, e.g., at the edge of the window cutout (7) and is directed towards the interior space thereof. This lock seam is located, e.g., at the edge of a section cutout, which will later be used in the installed door to receive the window pane. As is illustrated in FIG. 5, the lock seams (5, 6) point in opposite directions. Therefore, they cannot be hemmed or hemmed with the same tool and from the same side in one mounting.

The already bent and finished lock seams (5, 6) are shown in the drawings. They are formed from initially projecting flanges of the outer and inner sheets and bent in one or more hemming steps into the hemmed position shown in FIG. 5. The number of hemming steps depends on the original direction of the flange and the total bending angle to be obtained during hemming or hemming. For example, the flanges originally have an opening angle of about 90° in the embodiment being shown and are bent in two hemming steps into the hemmed position shown in FIG. 5. In sharp corner areas or in the area of characteristic kink lines on the outside of the door, additional hemming operations may be performed by means of corner hemming, kink hemming, repressing or the like.

FIG. 1 shows a first schematic variant of hemming device (2). It is designed for hemming inner and outer lock seams (5, 6) on two sides, and these hemming operations can be carried out in the workpiece mounting. In addition, the hemming operations may overlap each other in time or may also be carried out simultaneously. FIG. 1 shows a measuring means (47) and a control unit (48), which will be explained later.

Figure 2:
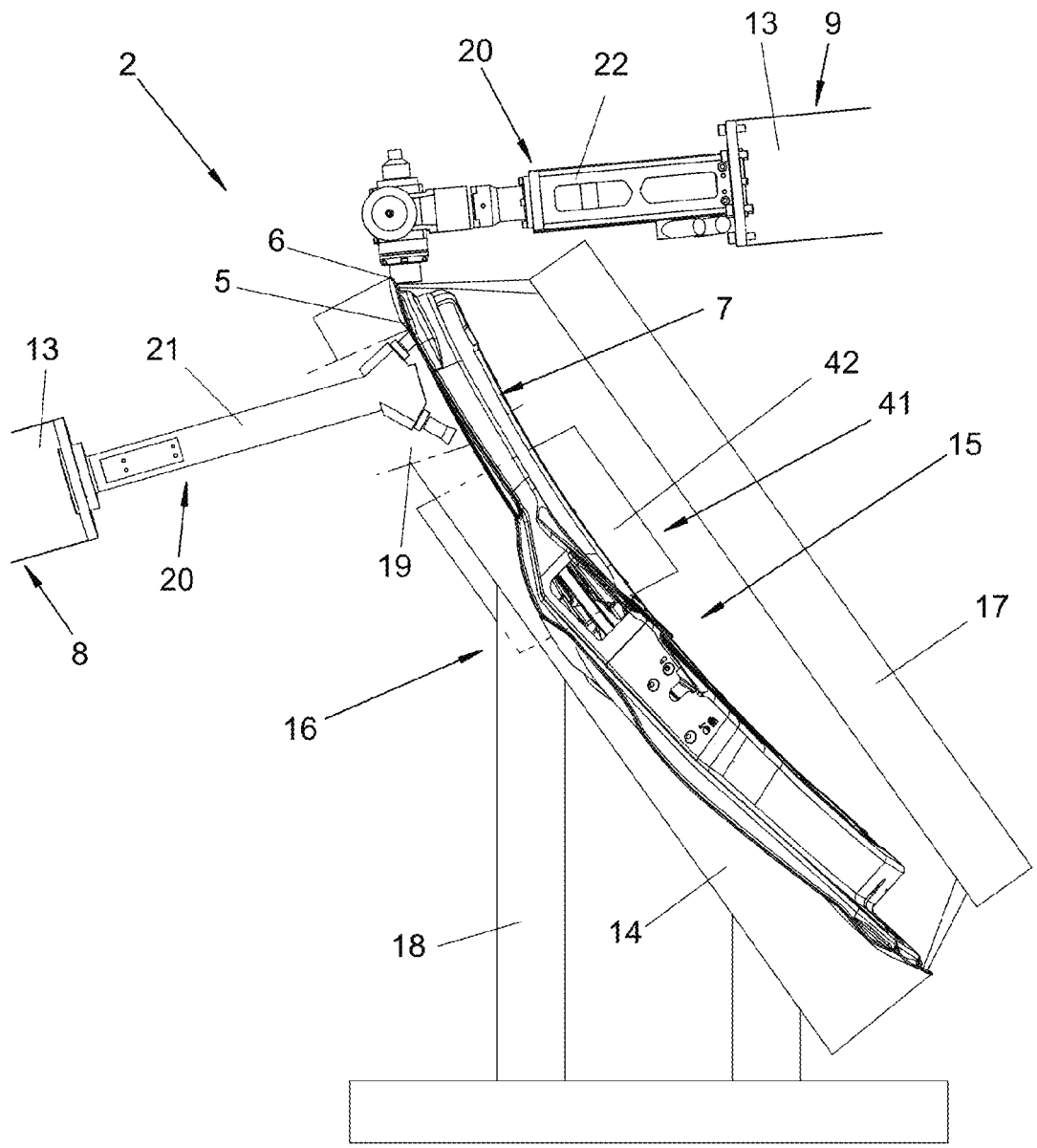
FIG. 2 is a cut-away side view of the hemming device with a hemming bed and suggested hemming robots according to arrow II in FIG. 1.
Figure 3:
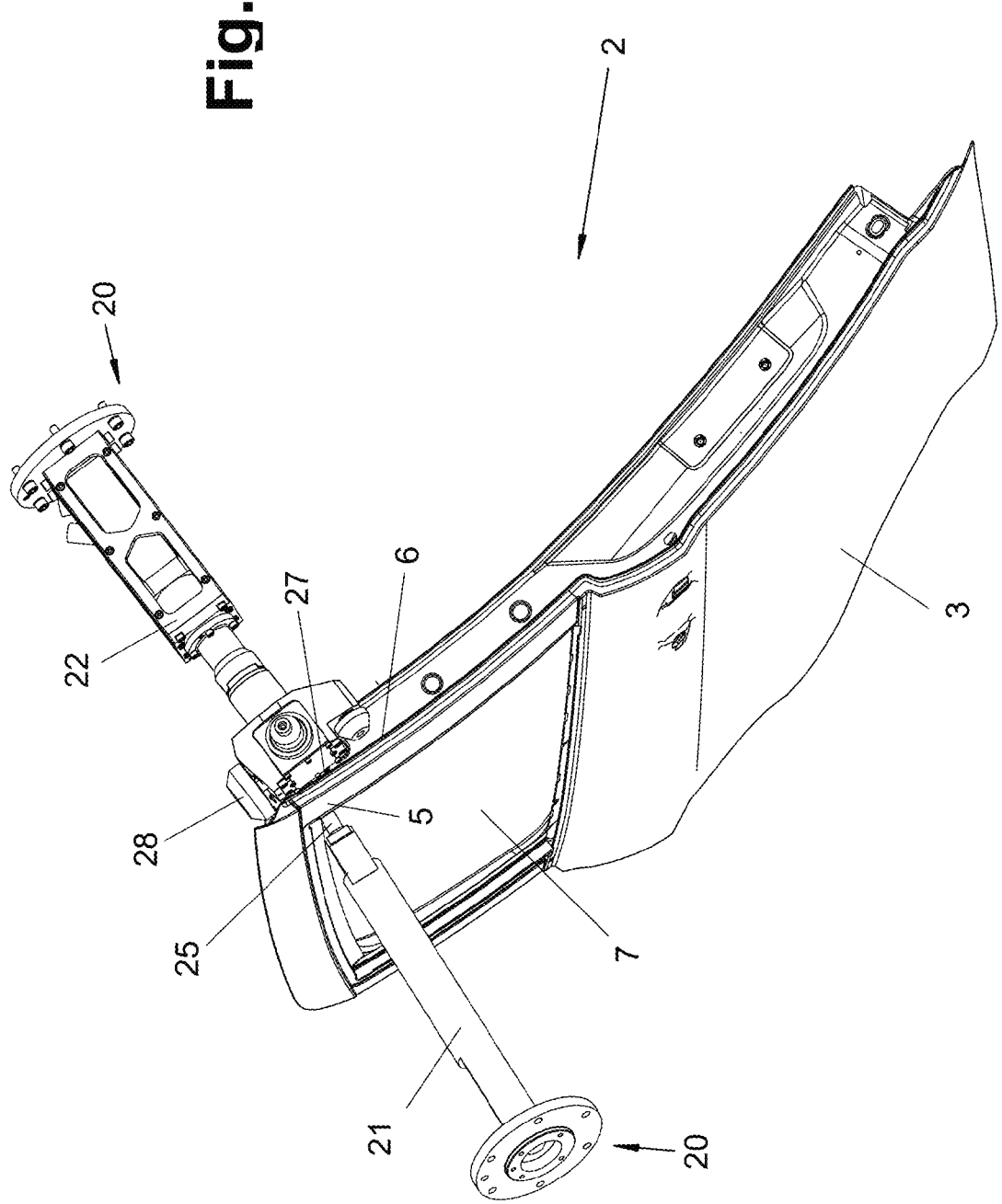
FIG. 3 is a perspective view of the hemming situation for FIG. 2 without hemming bed.

Hemming device (2) has one or more hemming beds (14) for one or more workpieces (3) and has a plurality of hemming robots (8, 9), which are arranged on different sides of the hemming bed (14). They may be arranged especially on mutually opposite sides, e.g., on the front side and the rear side (15, 16) of the hemming bed (14). FIG. 2 shows this hemming bed arrangement and the arrangement of the robots. The hemming robots (8, 9) carry out hemming processes at the inner and outer lock seams (5, 6) and on different sides of the workpiece, especially on the front side and the rear side. They may alternatively be arranged differently for this, e.g., in front of and next to the hemming bed (14), and perform corresponding motions.

Figure 4:
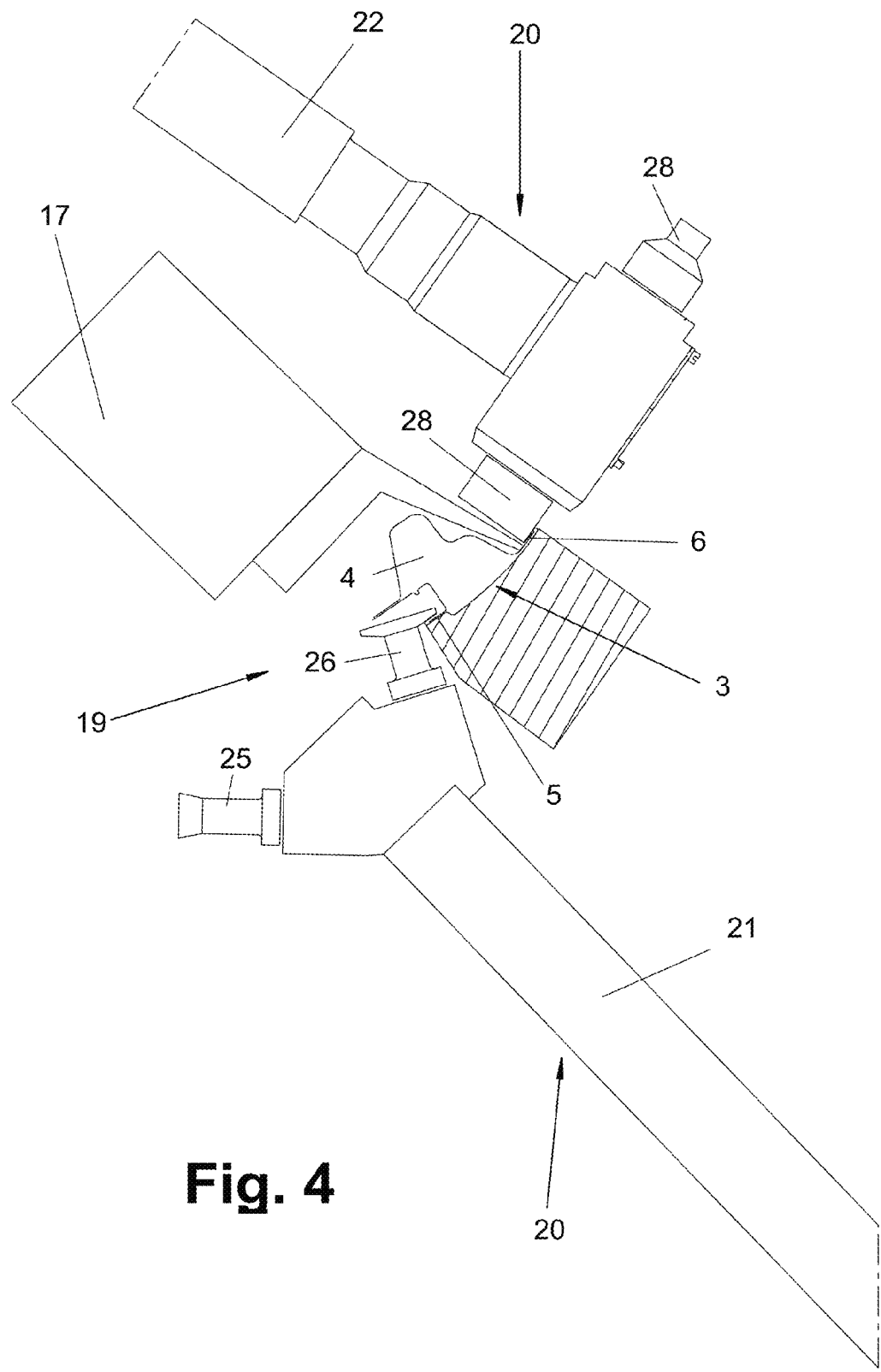
FIG. 4 is a cut-away sectional view of the workpiece with an inner flange and an outer flange, a hemming bed and two roller hemming heads.

Hemming bed (14) is designed for access from two sides to the inner and outer lock seams (5, 6) on the workpiece (3) and has a correspondingly suitable arrangement. Workpiece (3) lies on the front side (15) of the hemming bed (14) and is supported there at least in the area of the lock seam. There may be support and bedding here for the inner and outer lock seams (5, 6), as this is shown in FIGS. 4 and 5.

The outer lock seam (6) is accessible from the front side (15) for an outer lock seaming robot (9), which is located, e.g., in front of or next to the hemming bed (14). Hemming bed (14) may have a clamping means (17), which is arranged, e.g., on the front side (15) and is shown in FIGS. 2, 4 and 5. Clamping means (17) may be movable and controllable. It may have a single clamping device and/or a clamping frame.

Figure 9:
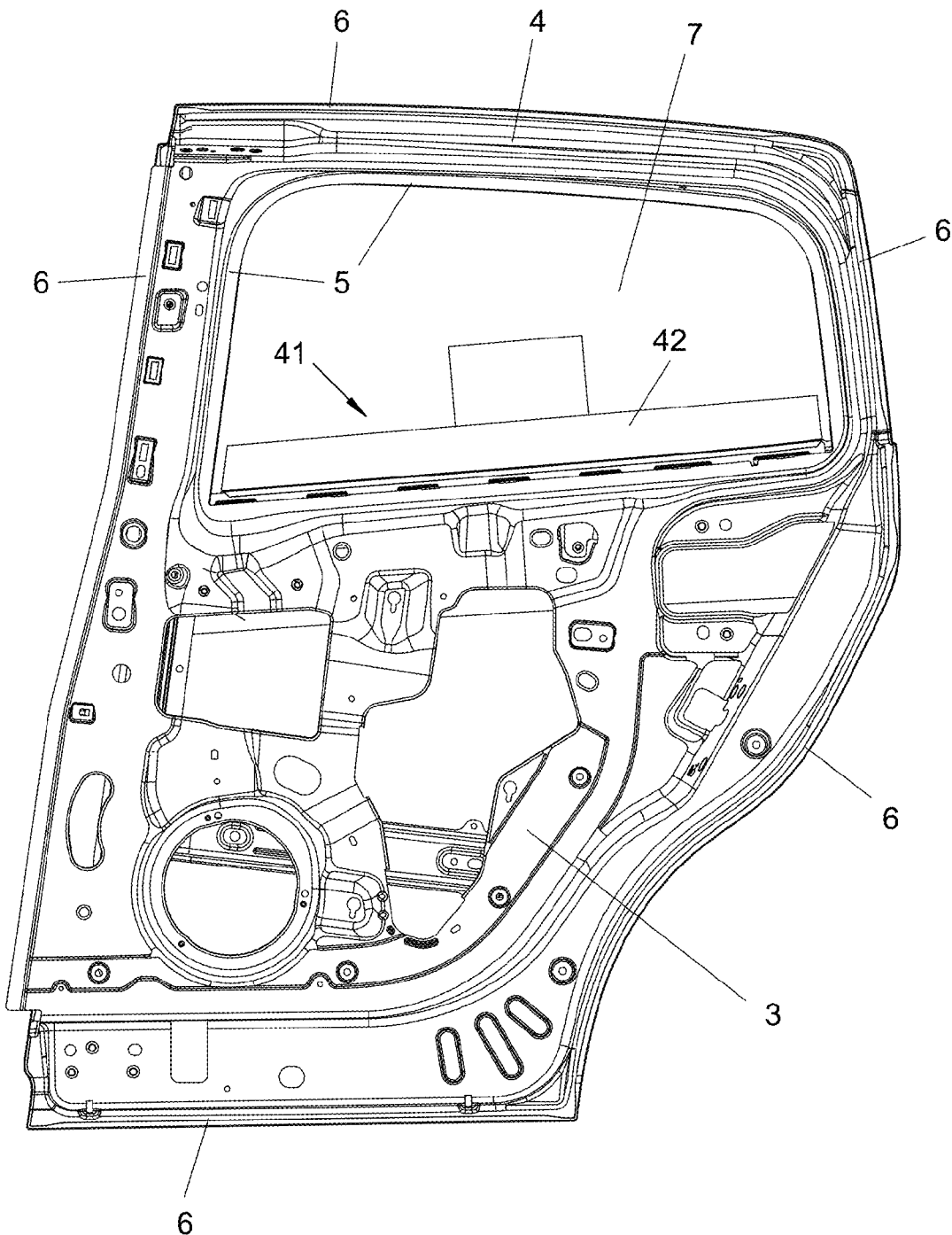
FIG. 9 is a top view of a side door of a vehicle.

For the inner lock seam (5) pointing towards the rear side (16), hemming bed (14) has a cutout (19), which is arranged in the area of the window cutout (7) and which may also be present multiply and also in another location in the door being shown in FIGS. 2 and 9. The inner lock seam (5) can be reached through the cutout (19) from the rear side (16) for an inner or rear-side or lateral hemming robot (8).

As is illustrated in FIG. 2, the hemming bed (14) is arranged at a support means (18), which is designed, e.g., as a multi-arm carrier or frame, which does not hinder the access for the robot. Hemming bed (14) has an upright position and is directed vertically or obliquely. As a result, the front and rear sides (15, 16) of the workpiece (3) and hemming bed (14) are accessible for hemming robots (8, 9), which may possibly be arranged on both sides. As an alternative, hemming bed (14) may have a lying and essentially horizontal position in a one embodiment, not shown, in which case the hemming robots act from the top and from the bottom.

In the simplest embodiment, the hemming bed (14) may be arranged stationarily and located at the floor of the shop or at another suitable location. Support means (18), which may be present, may be firmly connected to the foundation. In the embodiment shown in FIGS. 1 and 10 through 13, hemming bed (14) with its support means (18) is arranged on a conveying means (29) and can be moved. It may be arranged on the conveying means (29) rigidly or detachably. In particular, it may be located on a movable pallet (34), as it is suggested in FIG. 13.

Hemming device (2) has a plurality of robots (8, 9, 10, 11, 12). These are, on the one hand, hemming robots (8, 9), which are arranged on both sides of the hemming bed (14) and of the workpiece (3) on the front and rear sides (15, 16) thereof. Hemming robots (8, 9) are equipped with a hemming tool (20), which is designed especially as a roller hemming head (21, 22) and is moved by the respective hemming robots (8, 9) along the respective inner and outer lock seams (5, 6). The roller hemming heads (21, 22), which will be explained in more detail below, can be adapted to the hemming conditions and have various designs.

Figure 10:
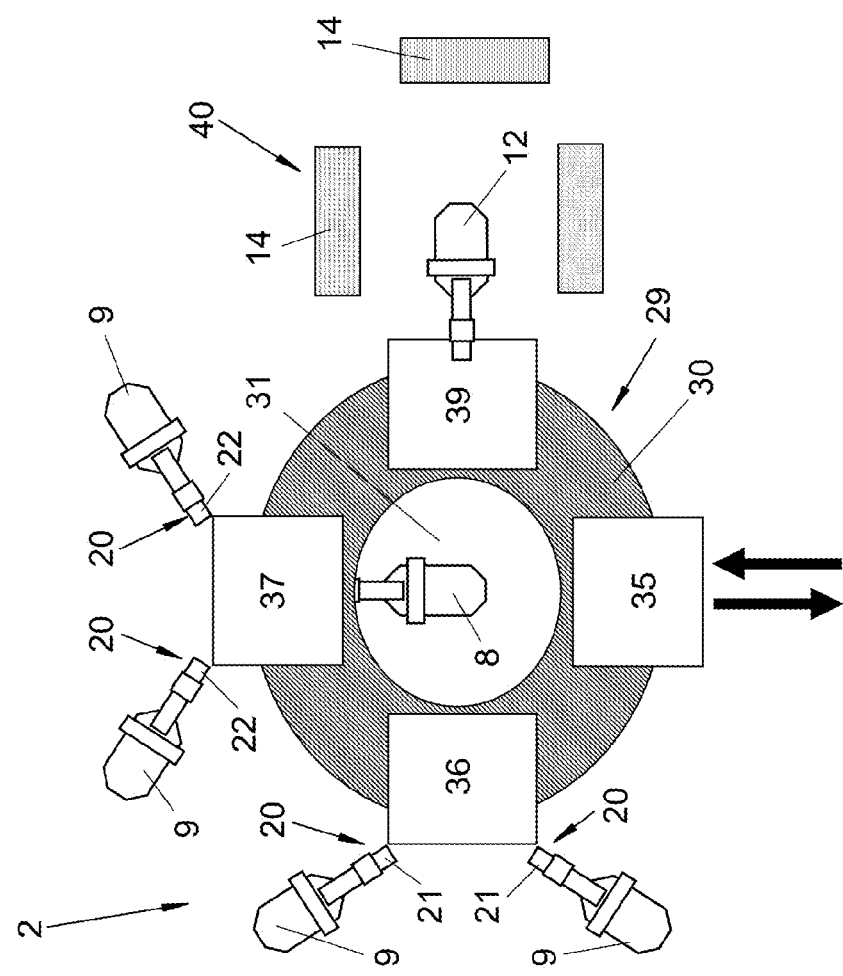
FIG. 10 is top view showing a variant of the arrangement of the hemming device.
Figure 12:
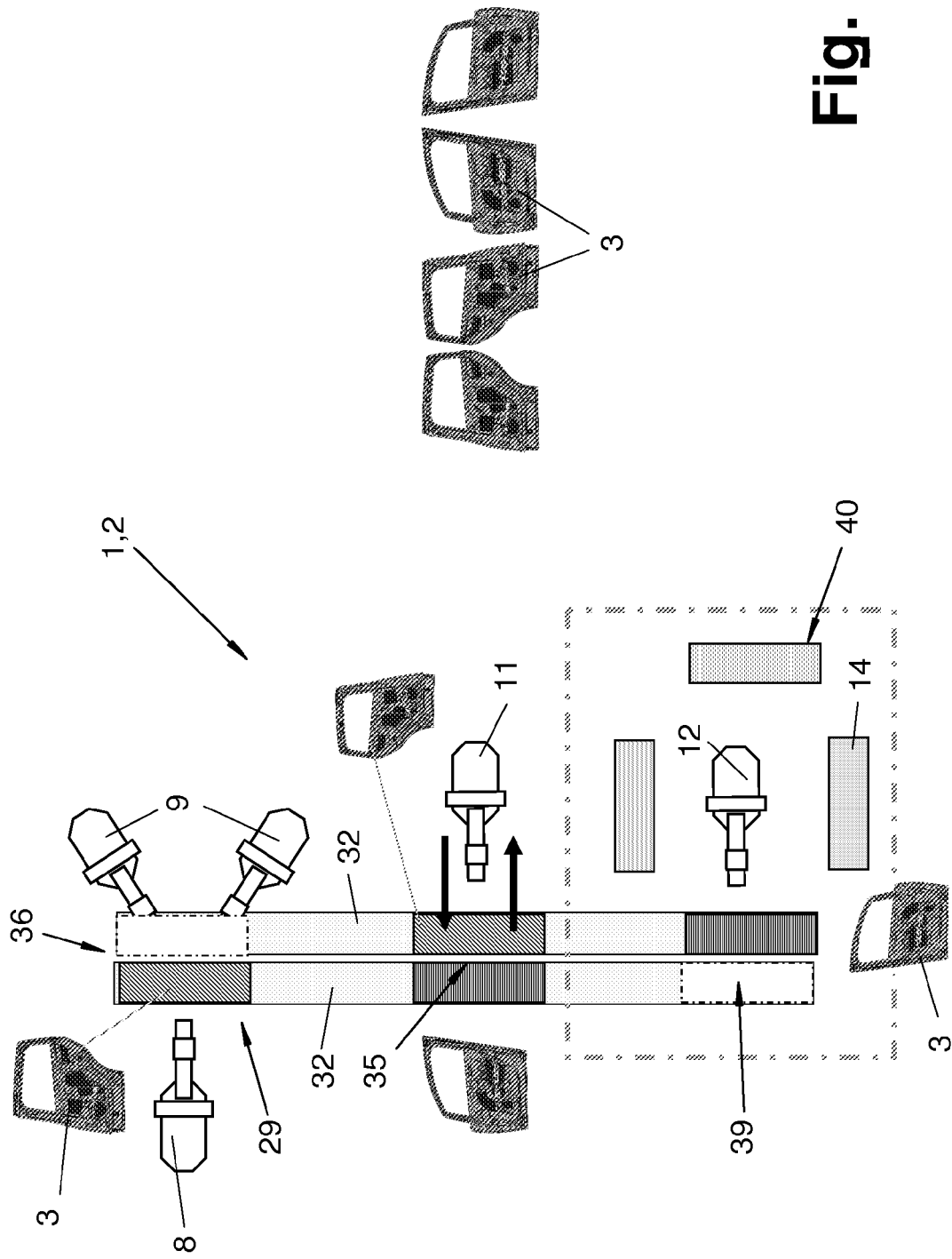
FIG. 12 is top view showing another variant of the arrangement of the hemming device.
Figure 13:
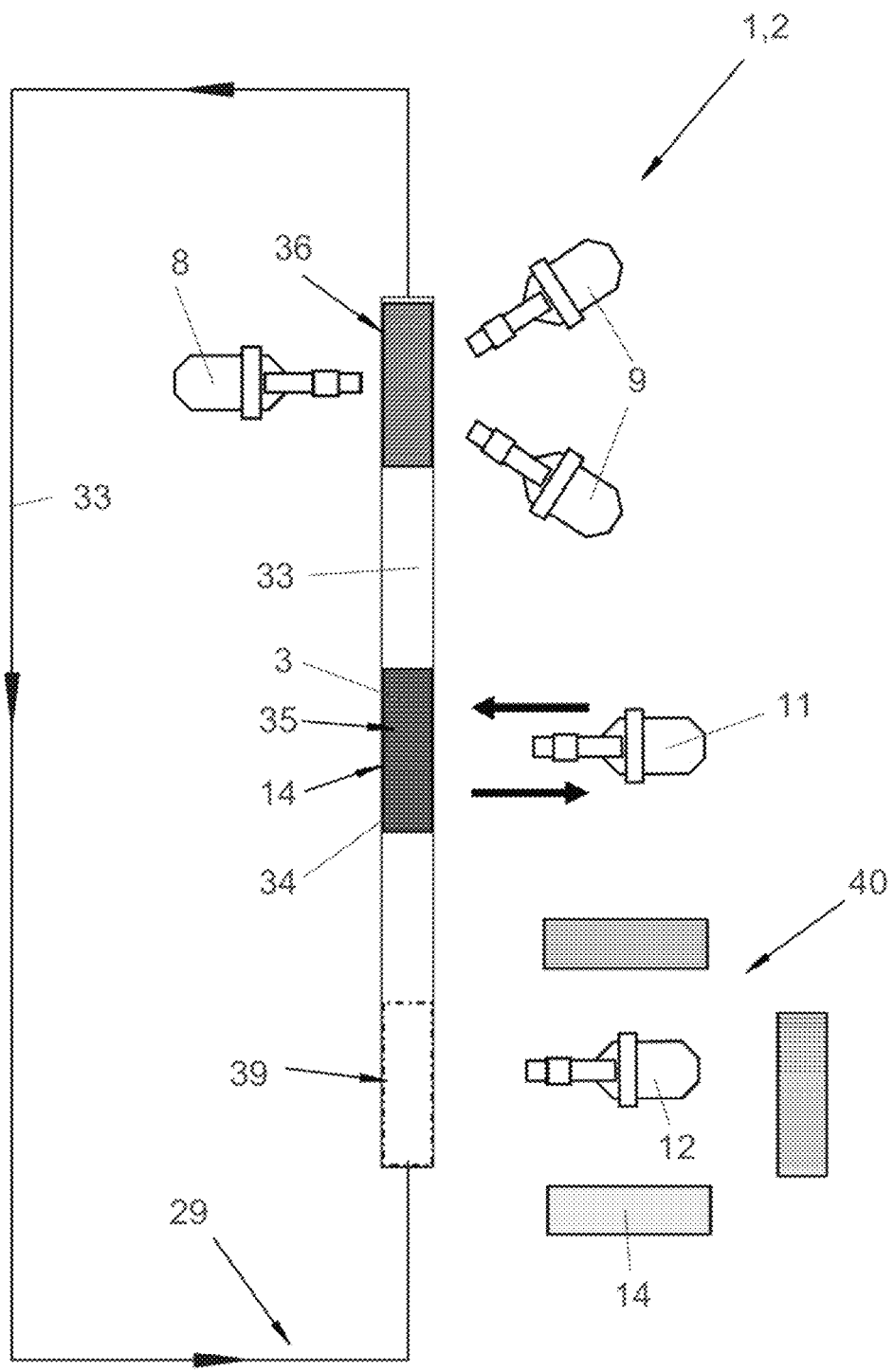
FIG. 13 is top view showing another variant of the arrangement of the hemming device.

Hemming device (2) may, furthermore, have a hemming robot (10), which is shown, e.g., in FIG. 1 and which is provided for hemming kinks, corner areas with narrow radii or other similar sites on the workpiece (3) which are critical for hemming. Furthermore, a robot (11) may be used to feed and remove the workpieces (3) and for loading and unloading the hemming bed (14). FIGS. 12 and 13 show such an arrangement. As an alternative, another suitable loading or feeding device may be used. Finally, hemming device (2) may also have one or more handling robots (12) for moving a transportable hemming bed (14), as this is shown in FIGS. 10, 12 and 13 and will be explained in more detail below.

Conveying means (29) may have various designs. FIG. 1 and FIGS. 10 through 13 show different exemplary embodiments herefor. Furthermore, a magazine (40) for identical or different hemming beds (14) or for pallets (34) may be arranged at the conveying means (29).

Robots (8, 9, 10, 11, 12) are multiaxial robots and may have any desired combination of rotatory and/or translatory axes. The embodiment shown pertains to articulated arm robots with six axes with a multiaxial robot hand (13), to which the hemming tools (20), especially the roller hemming heads (21, 22), are flanged. The connection may be fixed or detachable by means of a change coupling (not shown). Robots (8, 9, 10, 11, 12) may optionally have replaceable tools.

Robots (8, 9, 10, 11, 12) are arranged stationarily in the embodiments being shown and operate a hemming bed arrangement movable by means of conveying means (29). As an alternative or in addition, they may have another axis of motion, especially a travel or pivot axis, and can move as a result along a, e.g., stationary hemming bed (14) or a row of a plurality of hemming beds. The robots (8-12) may be upright or be suspended.

Figure 8:
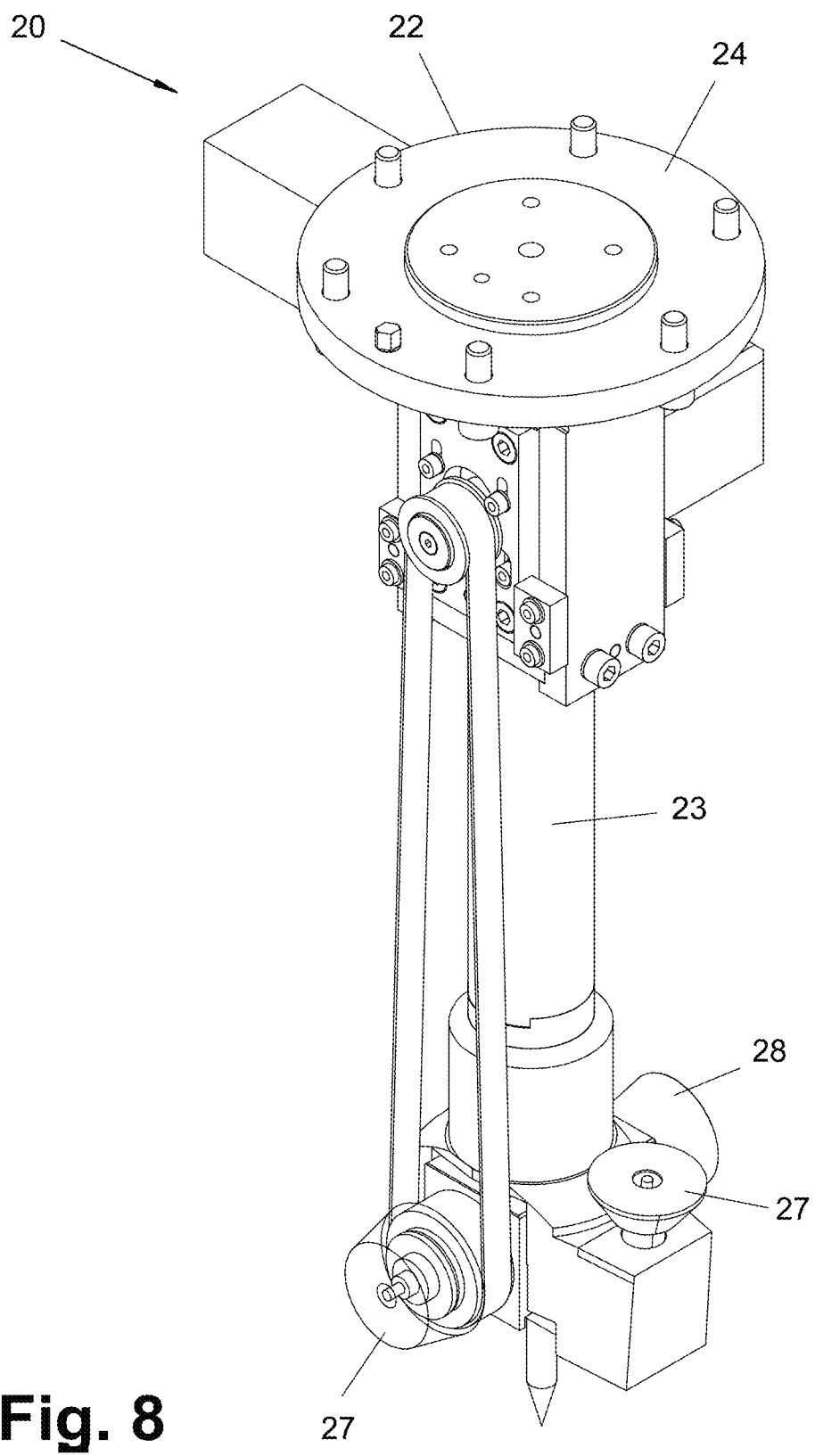
FIG. 8 is a perspective view of another roller hemming head.

The roller hemming heads (21, 22) mentioned in the introduction may have different designs depending on the hemming needs. FIG. 8 shows a roller hemming head (22), which is used, e.g., for the outer lock seam (6). It has an elongated and, e.g., cylindrical shaft (23), at the end of which a robot connection (24), e.g., a connecting flange, is arranged. One or more rotatable hemming rollers (27, 28) may be arranged at the other end of the shaft.

These hemming rollers (27, 28) may have a drive of their own, which is schematically indicated in FIG. 8 and rotatingly drives the respective hemming roller (27, 28). The circumferential velocity of the roller at the contact site with the flange or lock seam (6) can be adapted to the guiding velocity of the robot (9) such that it is, for example, equal and is directed in the same direction. As an alternative, the roller drive may be eliminated, in which case the corresponding hemming roller (27, 28) is mounted freely rotatably.

In FIG. 8, the roller hemming head (22) has three hemming rollers (27, 28), which are arranged on different sides of the shaft end, and they have a different shape, especially hem contour, and a varying orientation. The one hemming rollers (27) may have a conical shape in some areas and optionally a cylindrical pin for prehemming. The other hemming roller (28) for the finishing hemming may have an essentially cylindrical jacket. Two hemming rollers on opposite sides of the shaft end are possibly sufficient for other exemplary embodiments with the other lock seam designs. The number and shape of the hemming rollers (27, 28) may vary as desired and in adaptation to the respective workpiece and hem geometry.

FIGS. 6 and 7 show a roller hemming head (21) for inner hemming, which has a more slender shape corresponding to the narrower corner radii and the crowded space conditions. It likewise has a slender shaft (23) with a robot connection (24) and two hemming rollers (25, 26) at the front end of the shaft, which have each an oblique orientation here. They have each a cylindrical roller shaft with an end-side conical part, which has different slope angles. FIGS. 4 and 5 show the orientation of the roller hemming head (21) and the assignment of the roller to the inner lock seam (5).

FIG. 1 shows a first variant of the hemming device (2) and the conveying means (29) thereof. Hemming device (2) may also form a hemming station (1) here. Unlike in the embodiment being shown, a hemming station (1) may also have a plurality of identical or similar hemming device (2).

Hemming device (29) is designed here as a ring conveyor (30) or as a turntable. The hemming robots (8, 9) are arranged on opposite sides of the periphery of conveying means (29). A plurality of hemming robots (9) for the outer lock seam (6) are arranged on the outside of the ring conveyor or turntable (30). A single hemming robot (8) for the inner lock seam (5) is located in the center and, for example, especially in an interior space (31), which is kept free.

Conveying means (29) or the ring conveyor or turntable (30) has a plurality of work stations (35, 36, 37, 38), at which a respective hemming bed (14) is located. The ring conveyor or turntable (30) rotates about the central vertical axis cyclically by means of a controlled drive, and the work stations are changed. For example, four hemming beds (14) are located uniformly distributed on the ring conveyor or turntable (30). They may have identical design or different designs in adaptation to the specifications of the respective workpiece. The hemming beds (14) may be mounted permanently and are entrained during the rotation of the table. They are directed outwardly with their front sides (15) and towards the interior space (31) with their rear side (16).

A work station (35) is designed as a loading site, at which the workpieces (3) are fed and removed and are arranged at or removed from the hemming bed (14) located there. The ring conveyor or turntable (30) can rotate clockwise in the embodiment being shown. The next work station (36) is used for hemming the lock seams (5, 6). Two hemming robots (9), which together process the outer lock seams (6), are arranged on the outer periphery. The inner lock seam (5) is processed by the central hemming robot (8) in the interior space (31).

A second work station (37) for hemming follows in the direction of rotation. Two outer hemming robots (9) are likewise arranged here. The central hemming robot (8) can operate both work stations (36, 37) and rotates correspondingly. The roller hemming operations are completed at the second hemming station (37).

A fourth work station (38) may likewise be used for hemming, and, e.g., characteristic kinks, narrow corner areas or the like are hemmed here. The hemming robot (10), which has a suitable hemming tool (20), e.g., a corner shaper or the like, may be arranged on the outside here.

In the variant according to FIG. 10, which is more or less identical to FIG. 1, the fourth work station (39) has another design. It is used to change the hemming bed (14). A handling robot (12) or another suitable means, which picks up hemming beds (14) from a surrounding magazine (40) by means of a suitable gripping tool and changes them at the conveying means (29), is arranged herefor on the outside.

The hemming beds (14) may have the same design and be provided for the same workpiece (3), e.g., the door being shown, in both embodiments according to FIGS. 1 and 10. This door (3) is hemmed with a corresponding capacity. When changing from one workpiece to another, the hemming beds (14) can be replaced correspondingly one after another at the work station (39) according to FIG. 10. In a variant of the embodiment shown, the hemming beds (14) on the conveying means (29) may have various designs and be provided for different workpieces (3), especially doors, This makes possible the hemming of two, three, four or more different workpieces (3) in the same hemming device (2), and the hemming robots (8, 9, 10) can possibly change their tools according to the need. A work station (39) may also be provided for changing the bed in this variant as well. FIG. 12 shows, e.g., four different side doors.

Figure 11:
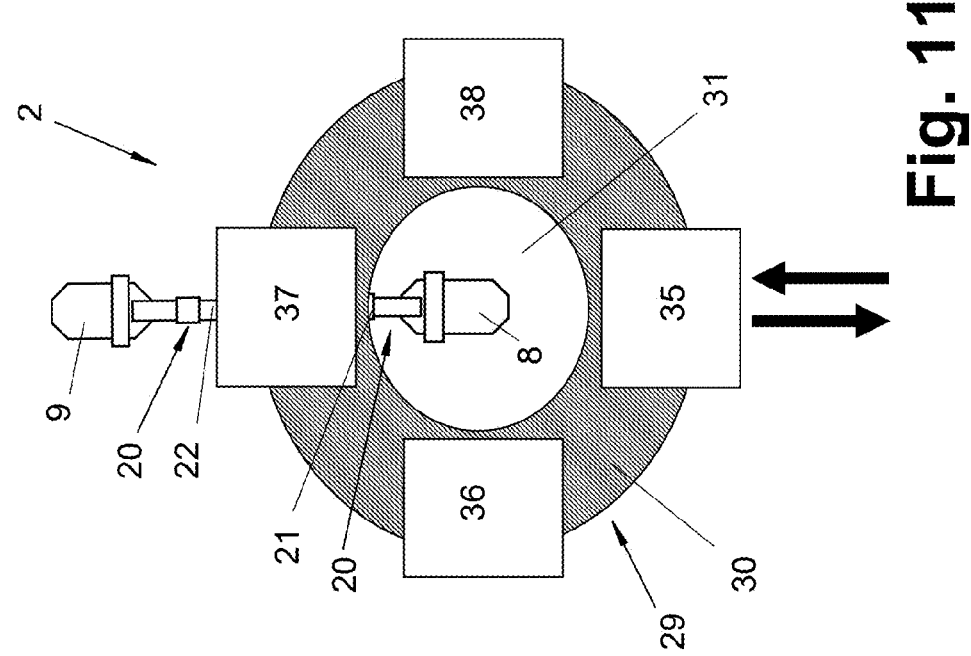
FIG. 11 is top view showing another variant of the arrangement of the hemming device.

FIG. 11 shows a simplified hemming device (2), in which the ring conveyor or turntable (30) has again a plurality of, e.g., four mounts for hemming beds (14), but only two work stations (35) are currently operated for loading and unloading and (36) is operated for hemming the inner and outer lock seams (5, 6) and these are equipped with robots (8, 9).

FIG. 12 shows a variant in which the conveying means (29) is designed as a linear conveyor with a reversing conveyor track (32). Two conveyor tracks (32) may extend in parallel here and alternatingly operate the work stations (35) for loading and unloading, (36) for hemming the lock seams (5, 6) and (39) for changing the hemming bed. This conveying means (29) may be designed, e.g., as a flip-flop, in which two mounts, arranged at axially locations from each other, are arranged movably for a hemming bed (14) each and driven. In a variant of the embodiment shown, one or both conveying tracks (32) may have an extension, e.g., a park position, above the work station (36).

In the variant according to FIG. 13, the conveying means (29) is designed as a ring conveyor with a circulating conveying track (33), on which, e.g., the above-mentioned pallets (34) may circulate. There is a work station (35) for loading and unloading, a work station (36) for hemming and a work station (39) for possibly changing the hemming beds (14) and/or the pallets (34) here as well. These work stations (35, 36, 39) may be arranged at a bent or linear conveying section of the ring conveyor.

The hemming robots (8, 9) are arranged on both sides of the conveying track (32, 33) and on the front and rear sides (15, 16) of the hemming bed (14) and workpiece (3) in the exemplary embodiments according to FIGS. 12 and 13 as well. Furthermore, additional work stations may be present in FIGS. 12 and 13 for hemming the inner and outer lock seams (5, 6) as well as possible corners, characteristic edges or the like. In a variant of all exemplary embodiments shown, the number of work stations (35, 36, 37, 38, 39) and also the arrangement thereof may vary at the conveying means (29). This number may be lower or higher than in the exemplary embodiments shown.

As is schematically suggested in FIGS. 2 and 9, the hemming device (2) may have an inner hemming device (41), which is arranged at hemming bed (14) or at frame (18) and has the corresponding hemming tools, e.g., pivotable hemming jaws along with drive for the one-step or multistep hemming of one or more flanges at the edge of the window cutout (7), besides the hemming robots (8, 9, 10) in the area of the window cutout (7). Such an inner hemming device (41) may be designed, e.g., corresponding to WO 99/037419 A1 or WO 99/037418 A1. The inner hemming device (41) may hem all flanges at the window cutout (7) or some of them. Other flanges may be hemmed by the hemming robots (8, 9, 10) in the above-described manner.

Furthermore, in a variant of the above-described exemplary embodiments, a hemming bed (14) may be of a multipart and modular design. Hemming bed (14) may be divided into a plurality of segments here, which are possibly arranged replaceably at the support means (18). In particular, an inner hemming bed (42), which forms part or a module of the hemming bed (14), may be arranged in the area of the window cutout (7). FIGS. 15 through 18 show such a hemming bed arrangement. Hemming bed (14) may be of a two-part design and have said inner hemming bed (42) as well as a surrounding, outer hemming bed area. It may, moreover, be modularized and segmented further, which may applies to both the inner hemming bed (42) and the other hemming bed areas.

According to FIGS. 15 through 18, the one-part or multipart inner hemming bed (42) may have an adjusting means (43), with which it can be moved to and fro between a working position in the area of the window cutout (7) and a retracted position, especially a lowered position. FIG. 17 shows the working position, in which the workpiece (3), especially a door shown schematically in FIG. 16, has flanges to be hemmed at the edge of the window cutout (7). This happens, e.g., when a door (3) has a movable pane displaceable or pivotable by means of a window lifter.

On the other hand, such a door (3), which has an identical type of construction, may have design variants, which differ in terms of the requirements on the window cutout (7) or the window area. If, e.g., a glass pane is mounted permanently in the window cutout (7) or a door (3) has no cut-out window cutout (7) in the sheet metal, no hemming operations need to be performed at the edge of the window cutout (7). The inner hemming bed (42) can be brought in such a case, according to FIG. 18, into a retracted position and possibly lowered by the adjusting means (43). As a result, it does not form an interfering contour for a window edge area having a different design of the workpiece (3). This is especially true if a cut-out sheet metal is present in this area according to FIG. 18.

Adjusting means (43) comprises, e.g., a plurality of lifting means with suitable drives, e.g., lifting cylinders, toggle levers of the like, at suitable locations, which are arranged, e.g., at the corner areas of the inner hemming bed (42) and which can absorb and support the forces occurring during hemming.

An inner hemming bed (42) and an adjusting means (43) of the above-mentioned type may optionally also be combined together with an inner hemming device (41) of the above-described type.

Figure 14:
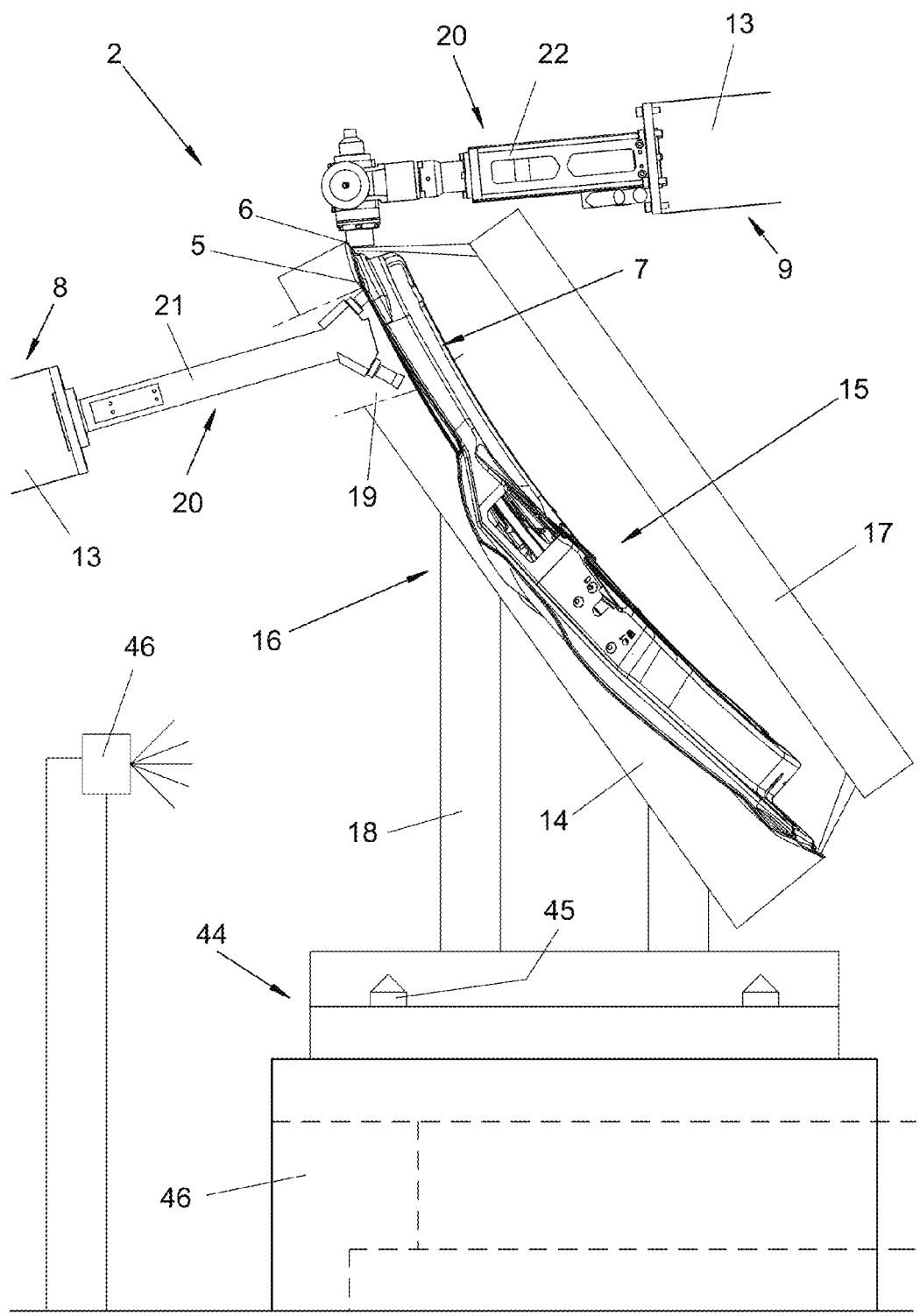
FIG. 14 is a cut-away side view of the hemming device with a measuring means and an interface for the defined hemming bed positioning.
Figure 15:
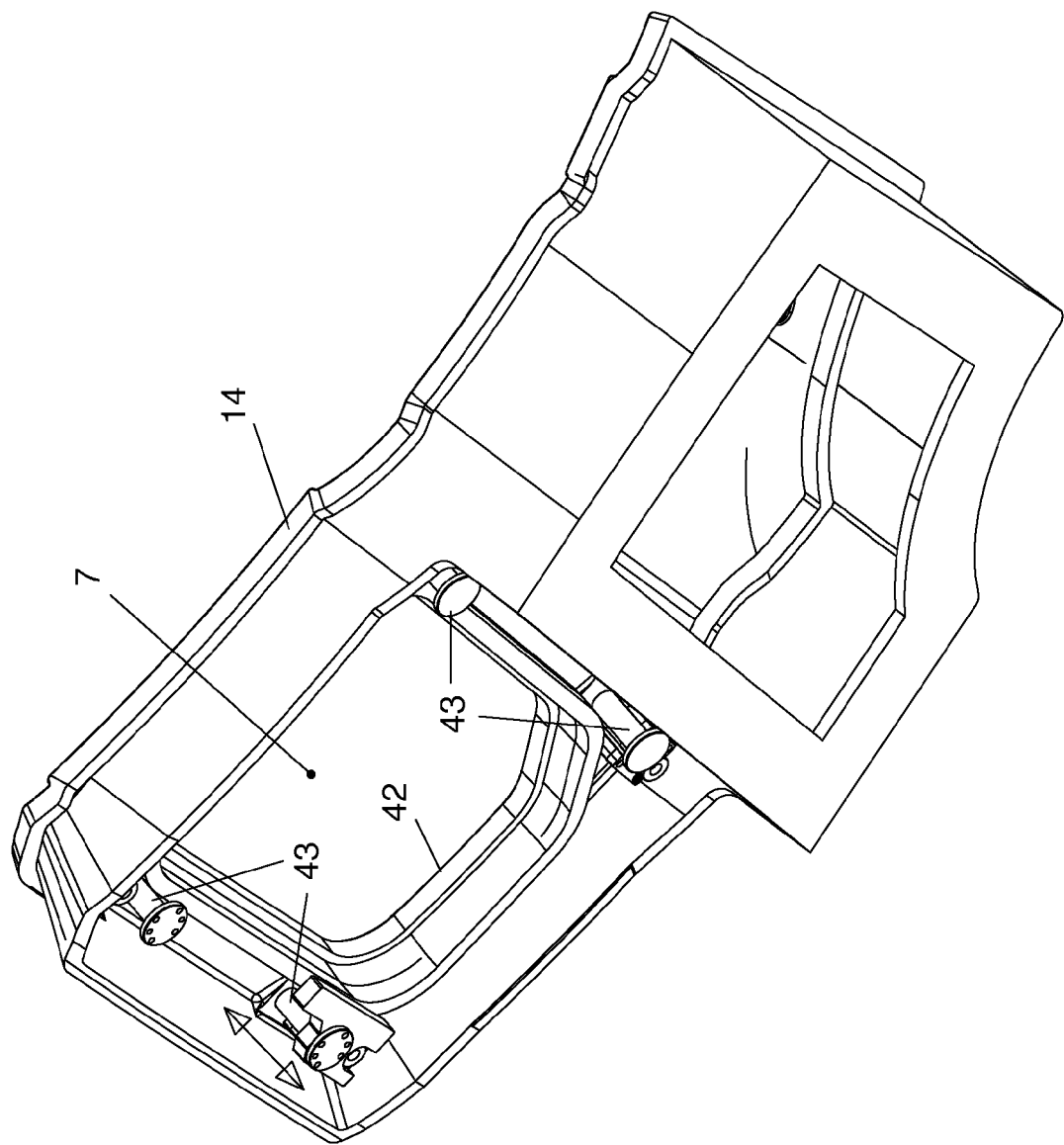
FIG. 15 is a perspective view of a hemming bed with a lowerable inner hemming bed.

FIG. 14 shows a variant of the hemming bed arrangement. Support means (18) for hemming bed (14) has a defined interface (44) here for accurate and reproducible positioning on a foundation (46). This foundation may be, e.g., a stationary base or a turntable indicated with broken lines.

Interface (44) ensures a defined, exact and absolute position of support means (18) and of hemming bed (14) as well as of the workpiece (3) located thereon in space. It has one or more positioning elements (45) for this, which act between foundation (46) and support means (18). Positioning elements (45) comprise, e.g., conical pins or so-called indexes at the foundation (46), which extend into fitting mounting openings on a base plate or the like of support means (18). The assignment may also be reversed. As an alternative, the position element or position elements (45) may also have a different design.

If hemming device (2) has a plurality of identical or different hemming beds (14) and support means (18), these may all have the same interface design.

According to FIGS. 1 and 14, a hemming device (1) may have a measuring means (47), which can detect some or all relevant components of the means, especially the robots (8, 9, 10, 11, 12), hemming bed (14) with a possible adjusting means (43) and with a clamping means (17), the hemming tool or hemming tools (20), a conveying means (29), which may be present, and an interface (44), which may be present for replaceable support means (18). Measuring means (47) may be of a one-part or multipart design. It detects the exact position and orientation of the above-mentioned components of the means in space as well as the mutual orientations thereof. Exact assignment to a possibly common reference point is thus given. This may be, e.g., the foot of a basic coordinate system of the hemming device (2) or of the hemming station (1) or of a coordinate system of the workpiece.

Robots (8-12), especially hemming robots (8, 9, 10), can be measured and calibrated with absolute precision. Possible tolerances and loads, e.g., due to a hemming tool (20), can thus be compensated. The robots (8, 9, 10, 11, 12) have exact kinematics due to the calibration.

Measuring means (47) may have any desired, suitable design and operate in any desired, suitable manner. In particular, it can detect and measure the components of the means optically. This may happen in various manners, e.g., with a laser measuring means, especially a so-called laser tracker. As an alternative, a measuring camera with an optical sensor and with an image analysis unit or other similar measuring technique may be used. Other tactile measurement methods or the like are possible as well. Measuring means (47) may have one or possibly more measuring heads arranged in a distributed pattern as well as an analysis means.

As is illustrated in FIG. 1, hemming device (2) or hemming station (1) may have a control unit (48), which controls some or all of the above-mentioned components (8, 9, 10, 11, 12, 14, 17, 20, 29, 42, 43) of hemming device (2) and the drives thereof. Control unit (48) may have an independent control unit. As an alternative, it may be integrated, e.g., in an existing control unit, e.g., a robot control unit. It is in control connected with the above-mentioned components via a line or in a wireless manner (not shown).

Control unit (48) has a computer with a plurality of memories and interfaces for inputting and outputting data and signals. In addition, it has a processing program stored, which also contains a path to be followed by the hemming robots (8, 9, 10) during the hemming process. The processing program is adapted to an exactly measured and calibrated position, design and possible kinematics of said components (8, 9, 10, 11, 12, 14, 17, 20, 29, 42) and also a possibly present interface (44) of hemming device (2). The processing program knows especially the shape and dimension of the hemming tools (20), especially of the roller hemming heads (21, 22) and the position of the tool center points of the hemming tools (20) related to the aforementioned reference point.

Control unit (48) can therefore control said components (8, 9, 10, 11, 12, 14, 17, 20, 29, 43) with high precision. If the configuration of hemming device (2) is changed, e.g., in case of replacement of a hemming bed (14) and of a support means (18), the changed components are measured anew on site with measuring means (17). Measuring means (47) is in connection with control unit (48) and transmits the measurement results to control unit (48), which detects possible changes in position and possibly in kinematics and adapts the processing program according to the measurement results. The deviations in position, orientation, direction, shape and dimensions that may have possibly been determined during the measurement can now be taken over as offset for the respective component into the processing program. The processing program does not otherwise have to be modified. In particular, it is not necessary to set up the hemming device (2) or the entire hemming station (1) completely anew and to prepare a new processing program.

Such changes in configuration occur, e.g., when a pilot hemming station (1) is built up and set up for a new workpiece (3), especially a body part, in parallel to an ongoing production and a production line for another workpiece (3) and this hemming station (1) is later taken over into and integrated within the production line when changing from one workpiece to another. Another application pertains to the manufacture of spare parts and workpieces (3) after the end of a mass production. A hemming station (1) of the type shown can then be used for the manufacture of different workpieces (3) or body parts and its configuration can be modified at the time of changing from one workpiece to another. The above-described interface (44) is favorable for this. The changing of a hemming tool (20) may also mean a change in configuration.

The control and measuring technique shown in FIG. 1 can also be used in the other exemplary embodiments according to FIGS. 10 through 13.

The above-described embodiments of the measuring and control technique as well as program adaptation, especially also the measuring means (47), interface (44) and control unit (48) with the adaptable processing program have an independent inventive significance, namely, each in itself, as well as combined. This also applies to the movable inner hemming bed (42) and the controllable setting means (43) thereof. These independent inventions may also be used in conventional hemming device with access on one side and/or with hemming processing on one side.

Various variants of the embodiments shown and described are possible. On the one hand, the number of the inner and outer hemming robots (8, 9) may be equal. It is also not necessary for both hemming robots (8, 9) to work together at a hemming work station if this is advantageous for reasons of cycle time. The hemming operations for the inner and outer lock seam (5, 6) may be carried out individually and one after another, while the workpiece (3) remains at the hemming bed (14). Finally, the number of robots (8, 9, 10, 11, 12) working at one work station may vary. The type and design of the hemming tools (20, 21, 22) may vary as well. The hemming tools (21, 22) may be roller hemming heads and may have, e.g., depending on the type and geometry of the lock seam (5, 6), a plurality of hemming rollers (25, 26, 27, 28) arranged one after another in the direction in which the lock seam extends. Furthermore, the shape and kinematics of the robots (8, 9, 10, 11, 12) are variable. The type and shape of the workpieces (3) and the shape of the hemming bed (14), which is adapted thereto, may vary as well.

While specific embodiments of the invention have been shown and described in detail to illustrate the application of the principles of the invention, it will be understood that the invention may be embodied otherwise without departing from such principles.

The invention claimed is:

1. A hemming device comprising:
   a conveying means comprising one of a ring conveyor and a turntable having an outer ring conveyor or turntable periphery;
   a plurality of identical or different hemming beds, each for at least one workpiece, the hemming beds being arranged on the conveying means for movement of all of the plurality of identical or different hemming beds therewith;
   a plurality of work stations arranged at or adjacent to a periphery of the ring conveyor or turntable, the work stations comprising at least two hemming stations, and the work stations comprising at least one loading and unloading station, at which the at least one workpiece is fed and removed from one of the hemming beds located at the loading and unloading station;
   a clamping means associated with each of the hemming beds, each clamping means for clamping a workpiece relative to the associated hemming bed;
   at least one loading robot at the loading and unloading station; and
   a plurality of hemming robots each with a hemming tool, one of the hemming robots being arranged in a center or an interior space of the ring conveyor or turntable, wherein the hemming device is for hemming inner and outer lock seams on the at least one workpiece, on both front and rear sides of the at least one workpiece, wherein at least two of the plurality of hemming robots are arranged outside the outer ring conveyor or turntable periphery to provide the hemming stations with one or more of the plurality of hemming robots outside the outer the ring conveyor or turntable periphery on a hemming bed front side and with said one of the hemming robots arranged in the center or the interior space of the ring conveyor or turntable on a hemming bed rear side and each of the hemming beds is designed and arranged for access from two sides, the front and rear sides, to form the inner and outer lock seams on the at least one workpiece.

2. A hemming device in accordance with claim 1, wherein the hemming beds have a cutout for a rear access to an inner lock seam.

3. A hemming device in accordance with claim 1, wherein the hemming beds have a bed for inner and outer lock seams.

4. A hemming device in accordance with claim 1, wherein the hemming beds have an inner hemming bed, which can be deactivated at least in some areas and can be lowered.

5. A hemming device in accordance with claim 1, wherein each of the hemming beds is segmented.

6. A hemming device in accordance with claim 1, further comprising a plurality of support means wherein each of the hemming beds is arranged upright or obliquely at one of the plurality of support means.

7. A hemming device in accordance with claim 6, wherein the support means for the hemming beds have a defined interface to provide for an exact and reproducible positioning of the support means on a foundation.

8. A hemming device in accordance with claim 6, wherein each of the support means with the hemming bed is arranged on the conveying means rigidly or detachably.

9. A hemming device in accordance with claim 1, further comprising:
   a measuring means for measuring a position of at least one of the conveying means, the hemming robots and the hemming bed; and a control unit controlling at least one of the conveying means, the hemming robots and the hemming bed based on the measured position.

10. A hemming device in accordance with claim 9, wherein the plurality of hemming robots are each measured and calibrated.

11. A hemming device in accordance with claim 1, wherein each of the hemming beds is arranged on a pallet and is detachably connected with the conveying means.

12. A hemming device in accordance with claim 1, further comprising an inner hemming device arranged at one of the hemming beds in an area of a window cutout of a workpiece.

13. A hemming device in accordance with claim 1, wherein the clamping means has a cutout for accesses from two sides to inner and outer lock seams.

14. A hemming device in accordance with claim 1, wherein the hemming robots carry a roller hemming head as the hemming tool.

15. A hemming device in accordance with claim 14, wherein the roller hemming head has a shaft with a robot connection and with one or more rotatable hemming rollers at a shaft end.

16. A hemming device in accordance with claim 14, wherein the roller hemming head has a plurality of different hemming rollers for different hemming steps.

17. A hemming device in accordance with claim 16, wherein the hemming rollers have a drive.

18. A hemming device in accordance with claim 1, wherein the hemming tool of at least one of the hemming robots is designed as a corner former.

19. A hemming device in accordance with claim 1, wherein the hemming device has a robot for loading and unloading the hemming bed.

20. A hemming device in accordance with claim 1, further comprising:
a magazine for the plurality of hemming beds; and
a handling robot for replacing said hemming beds.

21. A hemming device in accordance with claim 1, wherein the plurality of robots are arranged stationarily on a periphery of the conveying means.

22. A hemming device in accordance with claim 1, wherein the plurality of hemming robots are each an articulated arm robot having six axes.

23. A hemming device in accordance with claim 1, wherein the conveying means comprises a reversing or circulating conveying track.

24. A hemming device in accordance with claim 23, further comprising pallets, wherein the pallets are arranged with the hemming beds on the conveying track.

25. A hemming device in accordance with claim 1, further comprising a control unit with a processing program, which is adapted to a measured and calibrated position, design and kinematics of components of the hemming device.

26. A hemming device in accordance with claim 1, further comprising a control unit wherein the one of the ring conveyor and the turntable has an independent conveyor means drive that is controlled by the control unit.

27. A hemming device in accordance with claim 1, wherein at least three or more of the plurality of hemming robots are arranged outside the outer ring conveyor or turntable periphery.

28. A process for hemming workpieces, the process comprising the steps of:
providing a conveying means comprising one of a ring conveyor and a turntable having an outer ring conveyor or turntable periphery;
providing a plurality of identical or different hemming beds, each for at least one workpiece, the hemming beds being arranged on the conveying means for movement of all of the plurality of identical or different hemming beds therewith;
providing a plurality of work stations arranged at or adjacent to a periphery of the conveying means, the work stations comprising at least two hemming stations, and the work stations comprising at least one loading and unloading station, at which the at least one workpiece is fed and removed from one of the hemming beds located at the loading and unloading station;
providing a clamping means associated with each of the hemming beds, each clamping means for clamping a workpiece relative to the associated hemming bed;
providing at least one loading robot at the loading and unloading station;
providing a plurality of hemming robots each with a hemming tool, one of the hemming robots being arranged in a center or an interior space of the ring conveyor or turntable, wherein the hemming device is designed for hemming inner and outer lock seams on the at least one workpiece on both front and rear sides of the at least one workpiece, wherein at least two of the hemming robots are arranged outside the outer ring conveyor or turntable periphery to provide the hemming stations with one or more of the plurality of hemming robots on a front side and with said one of the hemming robots arranged in the center or the interior space of the ring conveyor or turntable on a hemming bed rear side for access from two sides, the front and rear sides, to form the inner and outer lock seams on the at least one workpiece; and
processing the at least one workpiece on the hemming bed by the plurality of hemming robots with the hemming tools, wherein the inner and outer lock seams on workpiece are hemmed on both front and rear sides by the hemming robots.

29. A process in accordance with claim 28, wherein at least one hemming robot with the hemming tool extends with the hemming tool through a cutout in the hemming bed and processes the inner lock seam on the at least one workpiece.

30. A process in accordance with claim 28, further comprising an inner hemming device wherein the at least one workpiece is processed in the area of a window cutout with the inner hemming device.

31. A process in accordance with claim 28, wherein a workpiece is clamped during hemming by a clamping means at hemming bed.

32. A process in accordance with claim 28, wherein an inner hemming bed part at one of the hemming beds can be deactivated, at least in some areas for processing workpieces of the same type having window cutout areas having different designs.

33. A process in accordance with claim 28, further comprising the step of providing a loading and unloading robot, wherein at least one of the hemming beds is loaded and unloaded with workpieces by the loading and unloading robot.

34. A process in accordance with claim 28, further comprising the step of providing a hemming bed transportation robot, wherein a transportable hemming bed is handled by the hemming bed transportation robot.

35. A process in accordance with claim 28, further comprising the step of providing a support means and a defined interface, wherein at least one of the hemming beds with a workpiece is held by the support means by means of the defined interface in an exact and reproducible position on a foundation.

36. A process in accordance with claim 28, wherein the robots are measured and calibrated.

37. A process in accordance with claim 28, wherein the conveying means and the hemming robots are controlled by a control unit with a processing program, which is adapted to an exactly measured and calibrated position, design and kinematics of components.

38. A process in accordance with claim 37, wherein in case of a change in the configuration of the conveying means and the hemming robots are measured on site with a measuring means and the processing program is adapted according to the measurement result.

* * * * *